(12) United States Patent
Kim et al.

(10) Patent No.: US 11,942,854 B2
(45) Date of Patent: Mar. 26, 2024

(54) TERMINAL CONNECTION STRUCTURE OF ELECTRIC ACTUATOR

(71) Applicant: KEYANG ELECTRIC MACHINERY CO., LTD., Seoul (KR)

(72) Inventors: Seongsoo Kim, Osan-si (KR); Sung Su Shin, Ansan-si (KR); Seung-Tae Yun, Ansan-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 296 days.

(21) Appl. No.: 17/668,787

(22) Filed: Feb. 10, 2022

(65) Prior Publication Data

US 2022/0360134 A1    Nov. 10, 2022

(30) Foreign Application Priority Data

Apr. 23, 2021   (KR) .................. 10-2021-0052931

(51) Int. Cl.
| | | |
|---|---|---|
| *H02K 5/22* | (2006.01) | |
| *H01R 12/70* | (2011.01) | |
| *H01R 13/11* | (2006.01) | |
| *H02K 7/116* | (2006.01) | |
| *H02K 11/30* | (2016.01) | |

(52) U.S. Cl.
CPC ......... *H02K 5/225* (2013.01); *H01R 12/7076* (2013.01); *H01R 13/112* (2013.01); *H02K 7/116* (2013.01); *H02K 11/30* (2016.01); *H01R 2201/10* (2013.01); *H02K 2211/03* (2013.01)

(58) Field of Classification Search
CPC .......... H02K 5/225; H02K 7/116; H02K 7/10; H02K 11/30; H02K 11/38; H02K 11/0094; H01R 12/7076; H01R 12/58; H01R 13/112; H01R 2201/10; H01R 2201/03; H01R 13/2464; H01R 13/533
See application file for complete search history.

(56) References Cited

U.S. PATENT DOCUMENTS

| | | |
|---|---|---|
| 2003/0022560 A1 | 1/2003 | Zemanik |
| 2020/0280146 A1 | 9/2020 | Schrader et al. |

FOREIGN PATENT DOCUMENTS

| | | | | |
|---|---|---|---|---|
| JP | 5213590 | B2 | 6/2013 | |
| JP | 2016149216 | A | 8/2016 | |
| JP | 2020005487 | A | 1/2020 | |
| KR | 10-1594012 | B1 | 2/2016 | |
| KR | 20170028987 | A * | 3/2017 | ............. H02K 11/33 |
| KR | 102187915 | B1 | 12/2020 | |

* cited by examiner

*Primary Examiner* — Bryan R Perez
(74) *Attorney, Agent, or Firm* — NKL LAW; Jae Youn Kim

(57) ABSTRACT

Proposed is a terminal coupling structure of an electric actuator in which a press rib is installed on the end of a contact plate such that a contact protrusion and a motor assembly terminal are more securely in contact with each other.

5 Claims, 10 Drawing Sheets

TERMINAL CONNECTION STRUCTURE OF ELECTRIC ACTUATOR

CROSS REFERENCE TO RELATED APPLICATION

This application claims priority to Korean Patent Application No. 10-2021-0052931 filed on Apr. 23, 2021, the entire content of which is hereby incorporated by reference.

BACKGROUND OF THE INVENTION

Field of the Invention

The present disclosure relates generally to a terminal coupling structure of an electric actuator. More particularly, the present disclosure relates to a terminal coupling structure of an electric actuator in which a press rib is installed on the end of a contact plate such that a contact protrusion and a motor assembly terminal are more securely in contact with each other.

Description of the Related Art

Generally, an electric actuator is a device that converts a driving force generated from a motor into rectilinear movement or rotational movement, and the torque of the motor rotates a rotating shaft thereof to generate rotational movement, and the torque and rotating direction of this rotational movement are changed through a gear assembly to be output.

Compared to an actuator using pneumatic or hydraulic pressure, the electric actuator is easily controlled and can be miniaturized and thus is widely used in vehicles.

For example, the electric actuator may be used as a driving source to operate a sunroof device installed on the ceiling of a vehicle. The sunroof device opens and closes a roof panel by mechanically connecting the roof panel configured to open and close the ceiling of a vehicle with the output shaft of the electric actuator by a gear or pulley.

Such an electric actuator may be manufactured in a smaller size compared to a pneumatic or hydraulic actuator and therefore has high space utilization. However, since the sunroof device is installed in limited space, the miniaturization of an electric actuator assembly is further required.

In addition, as the electric actuator is miniaturized, the electric actuator is vulnerable to external vibration, and an additional structure is required to more securely fix a terminal extending from the motor.

In order to solve the above problems, a structure for increasing the coupling force of a connection terminal coupled to a power terminal is disclosed in Korean Patent No. 10-1594012.

A conventional connector for electrical connection provided with a connection clip includes a coupling member 130 composed of a connection surface 131 and a fastening surface 132, a clip body 110 having a pair of connection members 140 and 142 extending from the coupling member 130 and formed by bending while branching to opposite sides, and an elastic member 120 elastically supported to press the connection members 140 and 142 of the clip body 110.

The structure of such a connection clip is configured such that the elastic member is installed on each of the connection members and presses the connection member which is in close contact with and coupled to a busbar B. However, when external impact or vibration occurs, the elastic member coupled to the connection member may be removed therefrom, and because of this, poor contact between the busbar and the connection member may occur.

Furthermore, in order to assemble the elastic member with the connection member, an additional assembly process is required, and thus assembly time may be prolonged and the assembly process may be made complicated.

DOCUMENT OF RELATED ART (Patent Document 1) Korean Patent No. 10-1594012

SUMMARY OF THE INVENTION

Accordingly, the present disclosure has been made keeping in mind the above problems occurring in the related art, and the present disclosure is intended to propose a terminal coupling structure of an electric actuator in which a press rib is installed on the end of a contact plate, and the contact protrusion of a fork terminal is more securely in contact with a motor assembly terminal such that a short circuit between the motor assembly terminal and the fork terminal due to vibration and external impact can be minimized.

In order to achieve the above objective, according to one aspect of the present disclosure, a terminal coupling structure of an electric actuator includes: a housing constituting an appearance of the electric actuator and having multiple parts installed in the housing; a motor assembly fixed to a side of the housing and having a motor assembly terminal so as to transmit power and various control signals to a motor and to generate a driving force; a gear assembly installed inside the housing and connected to the motor assembly so as to be rotated by receiving the driving force of the motor assembly; a circuit board fixed on a surface of the housing, the circuit board being configured to receive external power and various control signals so as to supply the power to the motor assembly and to control the motor assembly; a connection groove formed to be recessed inside the housing such that the motor assembly terminal is inserted into and is disposed in the connection groove; and a fork terminal installed on a surface of the circuit board, the fork terminal being inserted into the connection groove to be in contact with the motor assembly terminal, wherein the fork terminal includes: a fixed plate made of a metal plate having a predetermined thickness and coupled fixedly to the circuit board; a pair of contact plates formed by protruding forward from the fixed plate and disposed respectively on upper and lower sides of the motor assembly terminal; a terminal insertion groove formed between the contact plates different from each other by being recessed by a predetermined depth therefrom such that the motor assembly terminal is inserted into the terminal insertion groove; a contact protrusion formed to have a round shape on an end of each of the contact plates by protruding therefrom, the contact protrusion being in close contact with an upper or lower surface of the motor assembly terminal; and a press rib formed on the end of the contact plate by extending therefrom, the press rib being in close contact with an inner surface of the connection groove so as to allow the contact protrusion to press the motor assembly terminal.

The structure may further include: a press rib mounting groove formed in the inner surface of the connection groove such that the press rib is elastically transformed and is inserted into the press rib mounting groove while the press rib is inserted into the connection groove.

The press rib may be formed by protruding in a direction opposite to the contact protrusion.

The press rib may be formed on the end of the contact plate by bending in a direction opposite to an insertion direction of the contact plate.

The structure may further include: a guide surface formed on a side of the press rib mounting groove so as to be inclined at a predetermined angle, the guide surface being configured to guide the press rib into the press rib mounting groove.

The terminal coupling structure of an electric actuator according to the present disclosure has the following effects.

According to the present disclosure, the press rib may be installed on the end of the contact plate, and the contact protrusion and the motor assembly terminal may be more securely in contact with each other, thereby preventing a short circuit in the coupling portion of terminals to each other due to vibration or an external impact.

In addition, in a case in which without the press rib, the motor assembly terminal and the fork terminal are maintained to be in contact with each other for a long period of time, due to the deformation of the fork terminal, a short circuit of the motor assembly terminal may occur, but due to the installation of the press rib, even if the motor assembly terminal and the fork terminal are in contact with each other for a long period of time, the press rib may press the contact plate with a predetermined pressing force, thereby minimizing a short circuit between the motor assembly terminal and the fork terminal.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
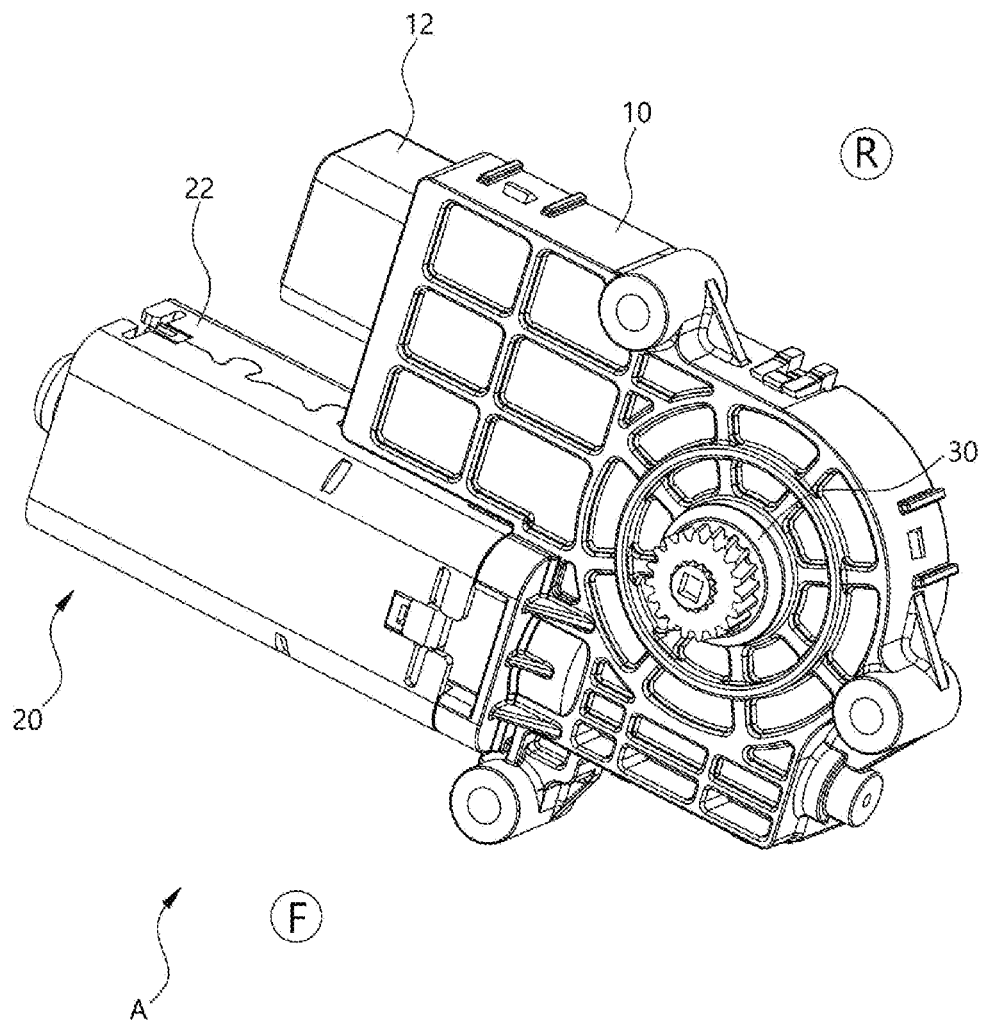
FIG. 1 is a front perspective view illustrating the configuration of an electric actuator of the present disclosure according to an exemplary embodiment.

Hereinafter, an exemplary embodiment of the present disclosure will be described in detail with reference to the accompanying drawings. In adding reference numerals to components of each drawing, it should be noted that the same components have the same reference numerals as possible even though they are indicated on different drawings.

In addition, in describing the embodiment of the present disclosure, when it is determined that a detailed description of a related known configuration or function interferes with an understanding of the embodiment of the present disclosure, a detailed description thereof will be omitted.

In addition, in describing the components of the present disclosure, terms such as first, second, A, B, (a), and (b), etc. may be used. These terms are only for distinguishing the components from other components, and the essence or order of the components are not limited by the terms. When a component is described as being "connected" or "coupled" to another component, the component may be directly connected to or coupled to the another component, but it should be understood that still another component may be "connected" or "coupled" thereto between each component.

The electric actuator of the present disclosure may be applied to various actuators used in a vehicle, such as a sunroof opening/closing device, a power transmission device of an automatic footrest, and a power transmission device for forward and rearward operations of a seat.

In addition to these, the electric actuator of the present disclosure may be applied in various fields other than a vehicle field.

Figure 2:
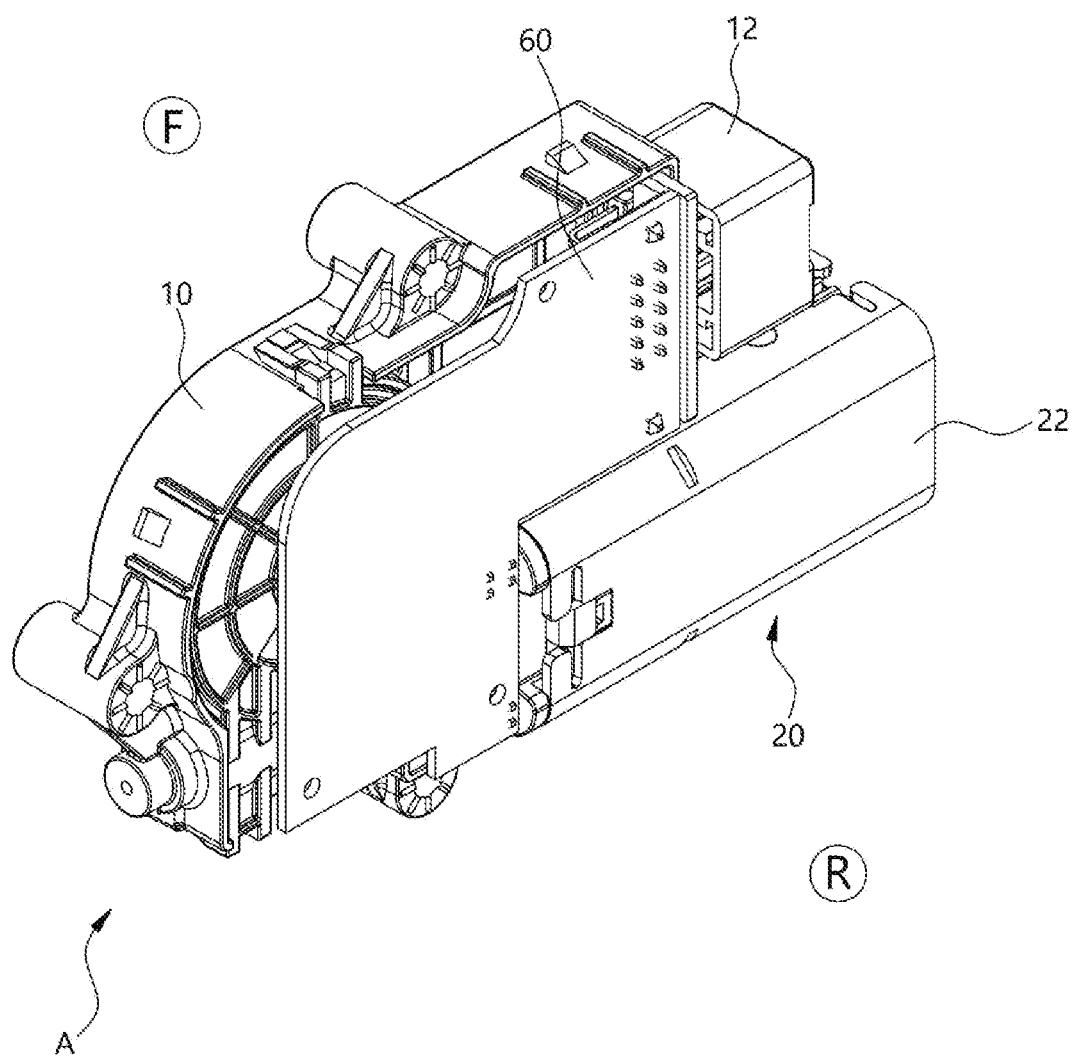
FIG. 2 is a rear perspective view illustrating the configuration of the electric actuator of the present disclosure according to the exemplary embodiment.
Figure 3:
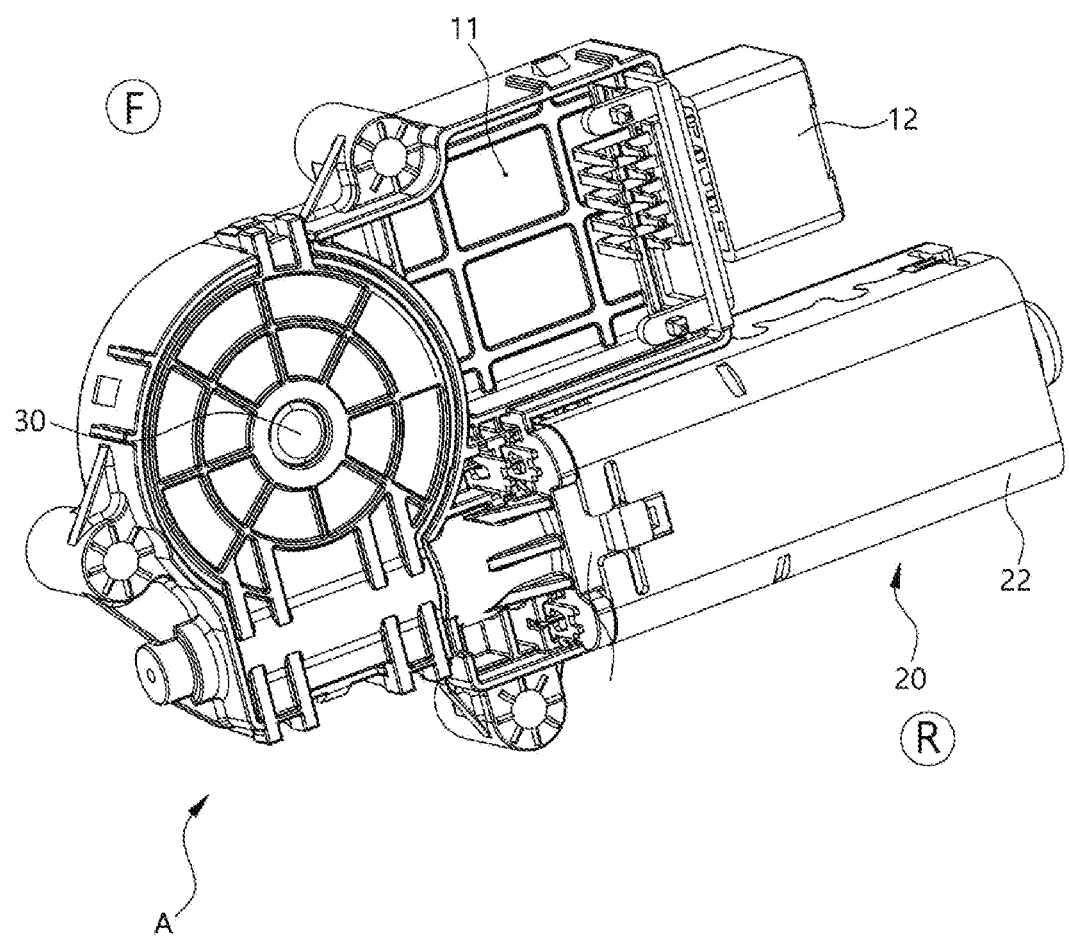
FIG. 3 is a rear perspective view illustrating a state in which a circuit board coupled to the rear surface of the a housing constituting the electric actuator of the present disclosure is removed therefrom.

FIG. 1 is a front perspective view illustrating the configuration of an electric actuator of the present disclosure according to the exemplary embodiment, FIG. 2 is a rear perspective view illustrating the configuration of the electric actuator of the present disclosure according to the exemplary embodiment, and FIG. 3 is a rear perspective view illustrating a state in which a circuit board coupled to the rear surface of the a housing constituting the electric actuator of the present disclosure is removed therefrom.

First, the configuration of the electric actuator (hereinafter, an actuator A) of the present disclosure according to the exemplary embodiment will be described with reference to FIGS. 1 to 3.

The actuator A may generally include the housing 10, a motor assembly 20, and the circuit board 60.

As illustrated in FIG. 1, the housing 10 may have an appearance that is bent in an approximate "L" shape. A connector 12 may be formed on the bent end of the housing 10, and a rotating shaft (not shown) may be inserted thereinto in a direction parallel to the direction of the connector 12, and the motor assembly 20 may be assembled with the housing 10.

The housing 10 may be configured as a hollow "L"-shaped frame, with one surface of the housing 10 being open as illustrated in FIG. 3.

Multiple parts may be installed and fixed inside or outside the housing 10, and the housing 10 may be a part constituting the appearance of the actuator A.

The connector 12 may be installed on a side surface of the housing 10. The connector 12 is a general connector, so detailed description thereof will be omitted. The connector 12 may be fastened to the side surface of the housing 10 and may be a part coupled with an external connection terminal (not shown).

In addition, the connector 12 may be electrically connected to the circuit board 60 to be described later and may function to transmit power and various control signals transmitted through the external connection terminal to the circuit board 60 to be described later.

The motor assembly 20 may be mounted to the lower part of the housing 10. The motor assembly 20 is a general motor assembly, so detailed description thereof will be omitted.

The motor assembly 20 may be largely composed of a motor housing 22, the motor (not shown), and a brush card assembly 24.

As illustrated in FIGS. 1 to 3, the motor housing 22 may have a hollow cuboid shape and may be configured to be open at front and rear sides of the motor housing 22. The motor housing 22 may constitute the appearance of the motor assembly 20, and may function to protect the motor (not shown) installed therein.

In addition, the brush card assembly 24 may be mounted to the front of the motor housing 22. The brush card assembly 24 is a general brush card, so detailed description thereof will be omitted. The brush card assembly 24 may be connected to the motor (not shown) installed inside the motor housing 22 and may supply power to the motor, and may function to control the rotation of the motor.

A gear assembly 30 may be installed inside the housing 10. The gear assembly 30 is a general gear assembly, so detailed description thereof will be omitted. The gear assembly 30 may be installed in front of the motor assembly 20 to be connected with the motor assembly 20 and may be a part rotated by receiving the driving force of the motor.

Figure 4:
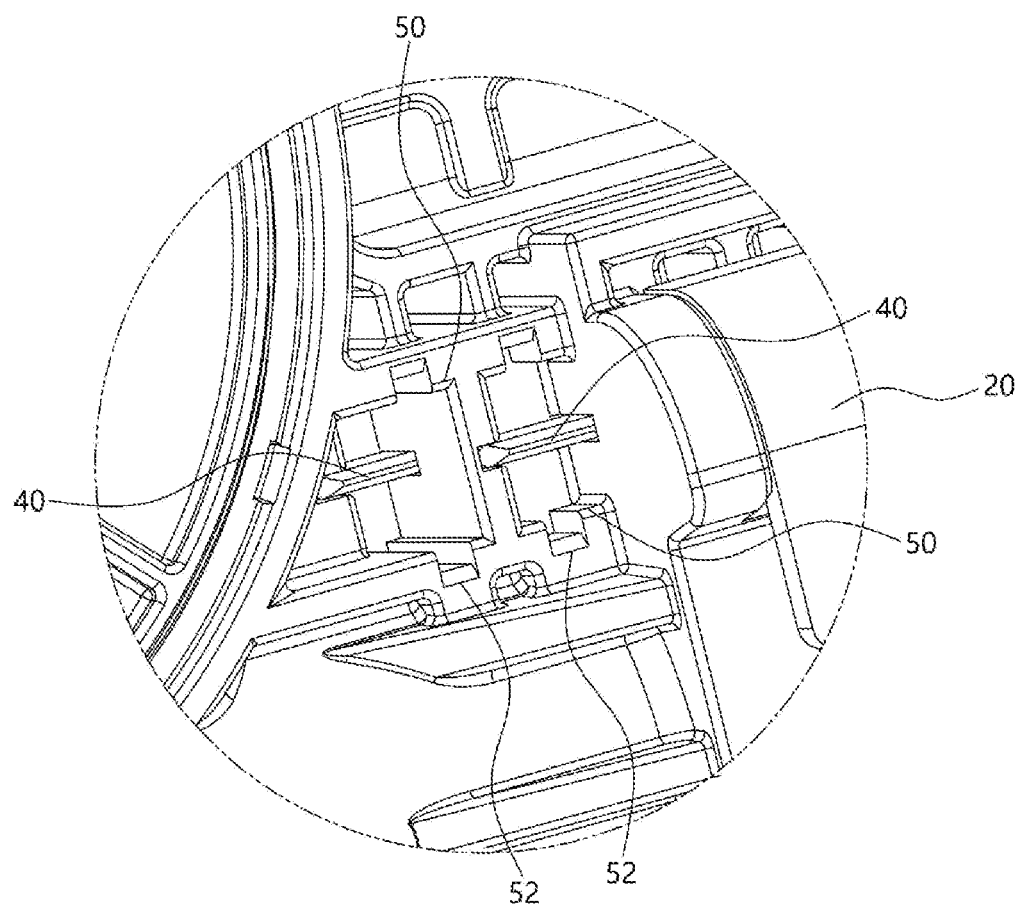
FIG. 4 is an enlarged perspective view illustrating a state in which the terminal of a motor assembly constituting the electric actuator of the present disclosure is disposed inside a connection groove.
Figure 5:
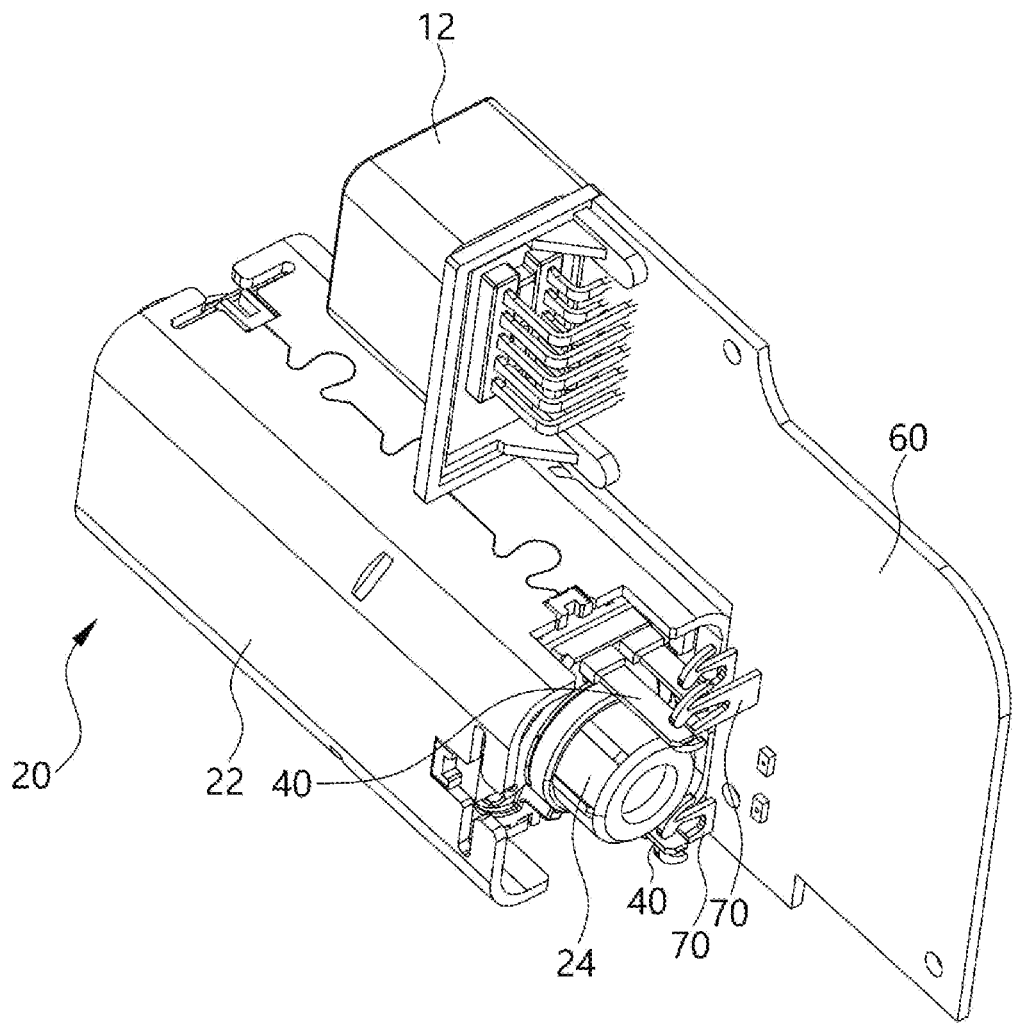
FIG. 5 is a front perspective view illustrating the configuration of a motor and the circuit board constituting the electric actuator of the present disclosure.
Figure 6:
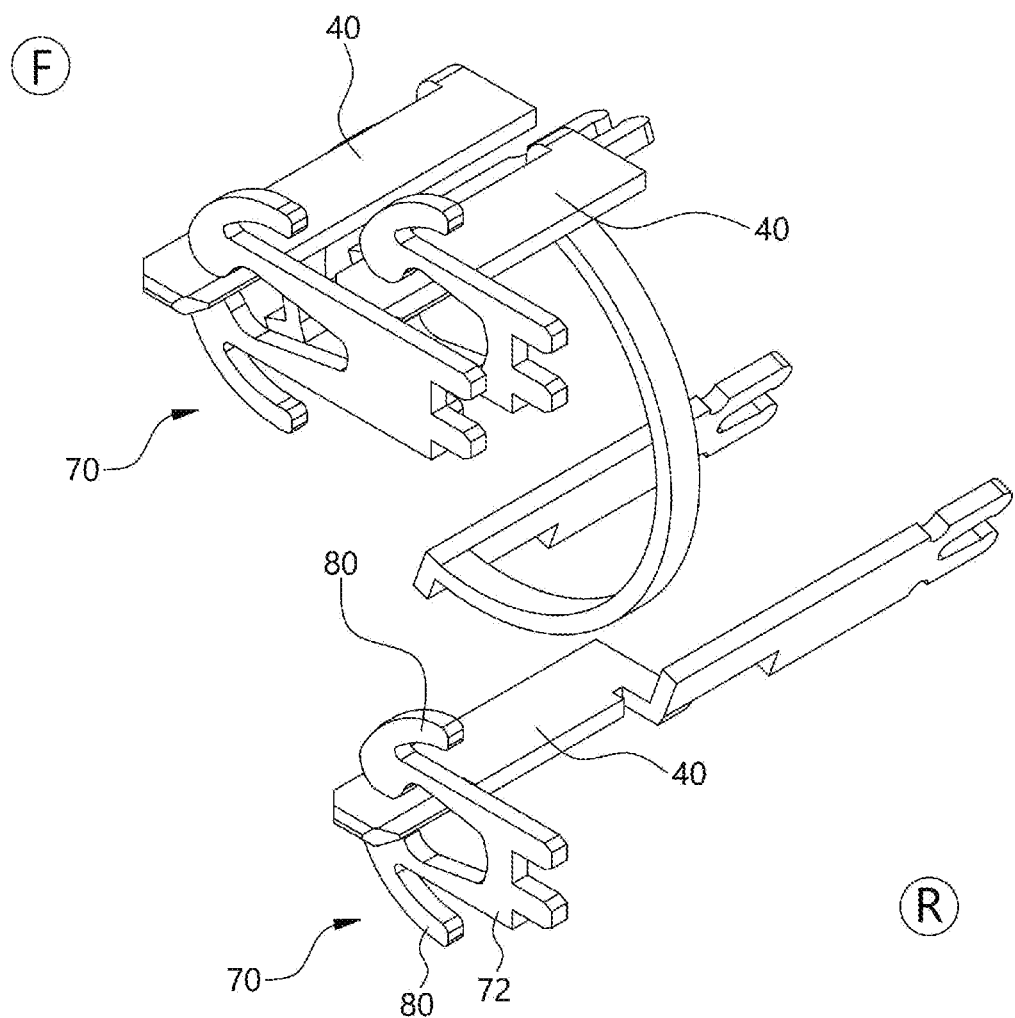
FIG. 6 is an enlarged perspective view illustrating a state in which a motor assembly terminal and a fork terminal constituting the electric actuator of the present disclosure are coupled to each other.
Figure 7:
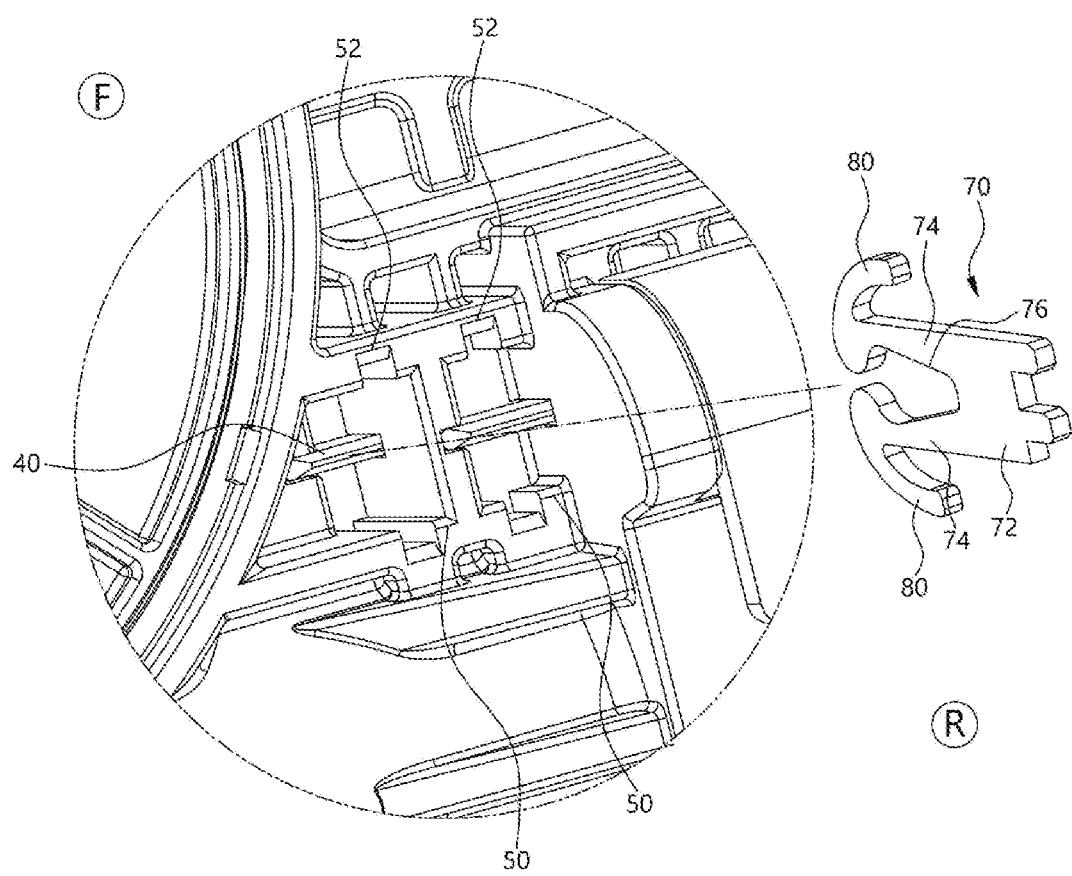
FIG. 7 is an enlarged perspective view illustrating a step prior to the insertion of the fork terminal into the connection groove constituting the electric actuator of the present disclosure.
Figure 8:
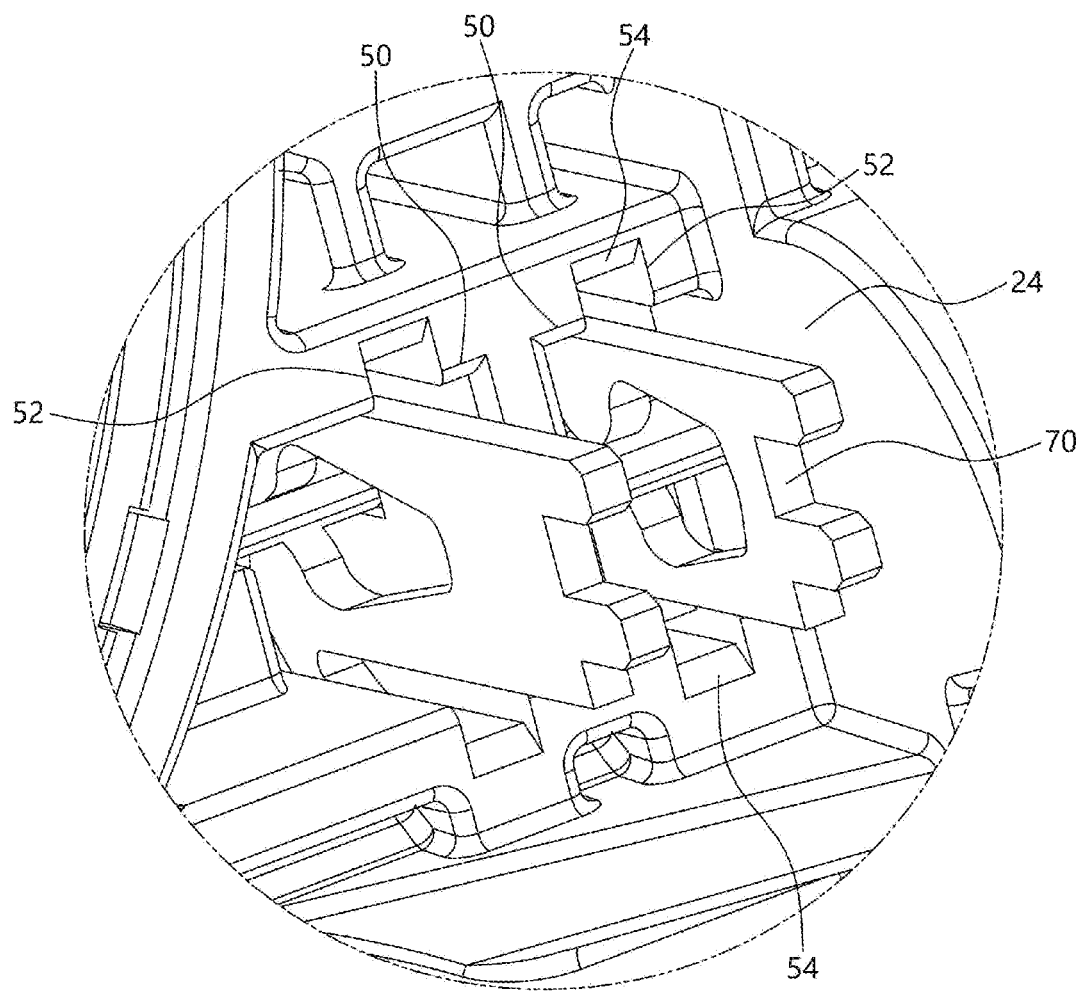
FIG. 8 is an enlarged perspective view illustrating a state in which the fork terminal is connected to the motor assembly terminal by inserting the fork terminal into the connection groove constituting the electric actuator of the present disclosure.
Figure 9:
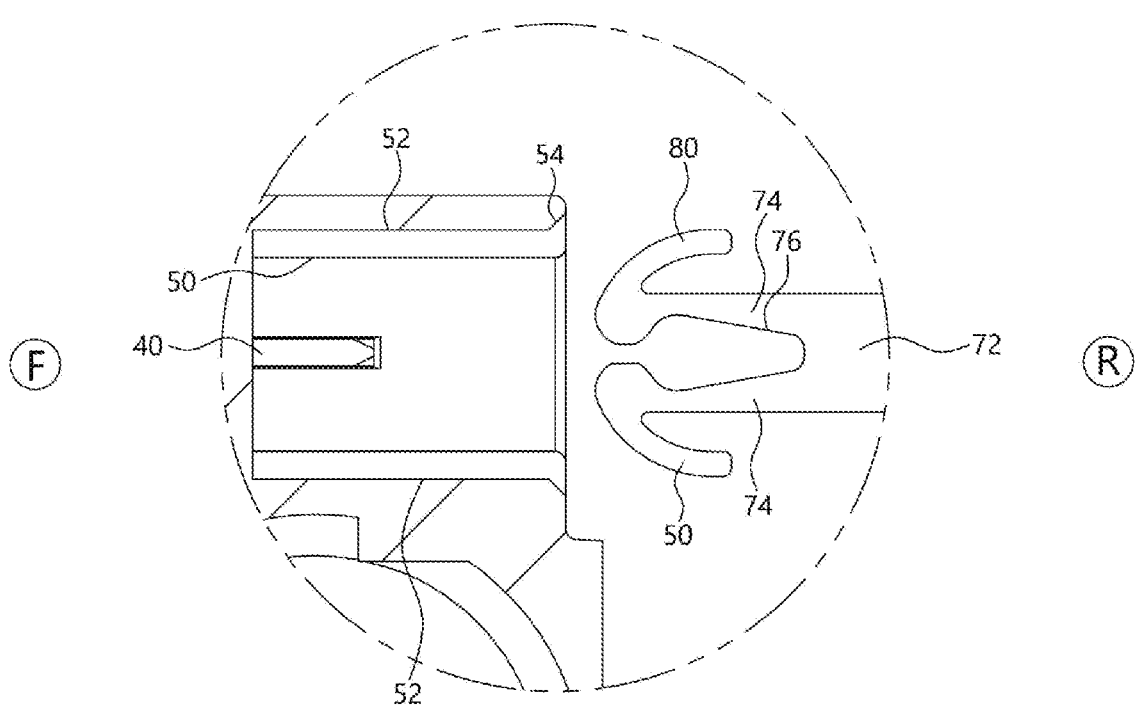
FIG. 9 is an enlarged sectional view illustrating the step prior to the insertion of the fork terminal into the connection groove constituting the electric actuator of the present disclosure.
Figure 10:
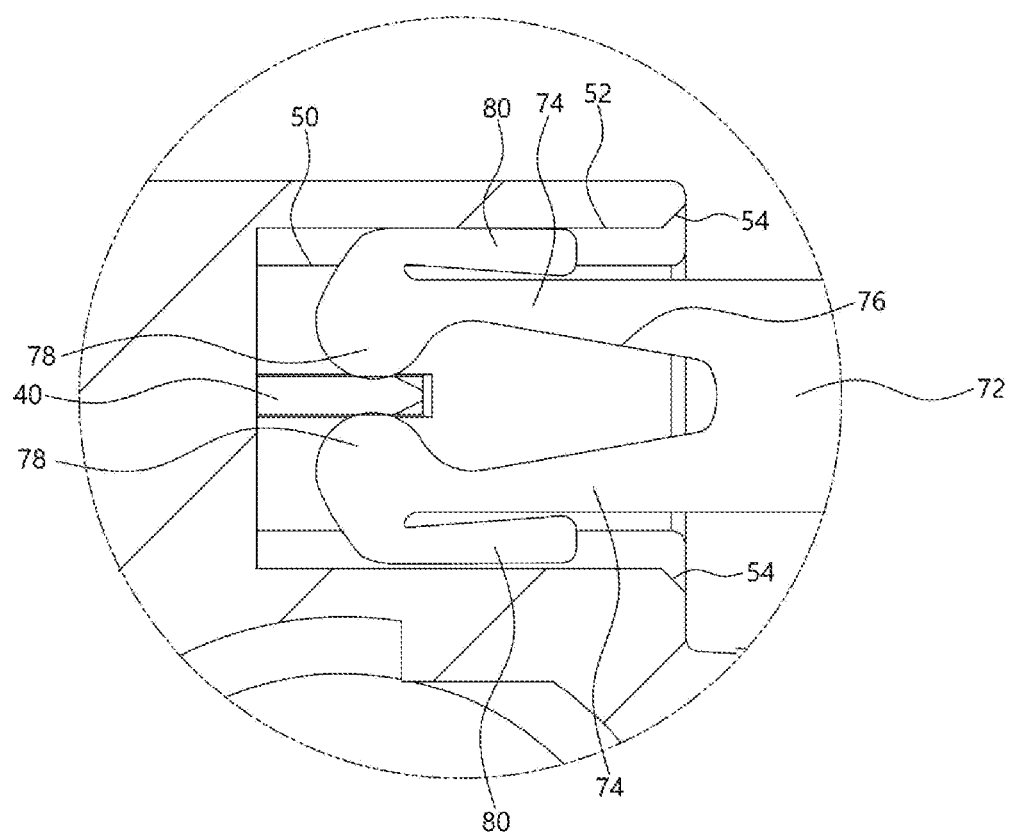
FIG. 10 is an enlarged sectional view illustrating the state in which the fork terminal is connected to the motor assembly terminal by inserting the fork terminal into the connection groove constituting the electric actuator of the present disclosure.

FIG. 4 is an enlarged perspective view illustrating a state in which the terminal of the motor assembly constituting the electric actuator of the present disclosure is disposed inside a connection groove, FIG. 5 is a front perspective view illustrating the configuration of a motor and the circuit board constituting the electric actuator of the present disclosure, FIG. 6 is an enlarged perspective view illustrating a state in which a motor assembly terminal and a fork terminal constituting the electric actuator of the present disclosure are coupled to each other, FIG. 7 is an enlarged perspective view illustrating a step prior to the insertion of the fork terminal into the connection groove constituting the electric actuator of the present disclosure, FIG. 8 is an enlarged perspective view illustrating a state in which the fork terminal is connected to the motor assembly terminal by inserting the fork terminal into the connection groove constituting the electric actuator of the present disclosure, FIG. 9 is an enlarged sectional view illustrating the step prior to the insertion of the fork terminal into the connection groove constituting the electric actuator of the present disclosure, and FIG. 10 is an enlarged sectional view illustrating the state in which the fork terminal is connected to the motor assembly terminal by inserting the fork terminal into the connection groove constituting the electric actuator of the present disclosure.

Hereinafter, the motor assembly terminal 40, the circuit board 60, and the fork terminal 70 which are mounted to the motor assembly 20 will be described in detail.

A plurality of motor assembly terminals 40 may be installed inside the brush card assembly 24. As illustrated in FIGS. 5 and 6, each of the motor assembly terminals 40 may be made of a rectangular metal plate, and a portion thereof may be installed inside the brush card assembly 24, and a portion thereof may be formed by protruding forward from the brush card assembly 24.

Furthermore, while the motor assembly 20 is mounted to the lower part of the housing 10, the motor assembly terminals 40 may be respectively disposed inside a plurality of connection grooves 50 to be described later.

The motor assembly terminal 40 may include a plurality of motor assembly terminals formed by protruding forward from the brush card assembly 24, and the plurality of motor assembly terminals may be respectively disposed inside the connection grooves 50 to be described later. The motor assembly terminal 40 may be disposed inside the connection groove 50 to be described later and may be connected to the fork terminal 70 to be described later, and may function to transmit power and various control signals to the motor assembly 20.

The connection groove 50 may be formed inside the housing 10. As illustrated in FIG. 4, the connection groove 50 may be configured to have a rectangular box shape having one open surface and may be formed by being recessed by a predetermined depth from the housing 10. The motor assembly terminal 40 may be disposed inside the connection groove 50 and may be coupled to the fork terminal 70 to be described later. The inside of the connection groove 50 may be a part in which the motor assembly terminal 40 and the fork terminal 70 to be described later are connected to each other.

A press rib mounting groove 52 may be formed in each of the upper and lower surfaces of the inside of the connection groove 50. The press rib mounting groove 52 may be configured to have a width equal to or greater than the thickness of the fork terminal 70 to be described later. Accordingly, the press rib mounting groove 52 may be formed in the center of each of the upper and lower surfaces of the inside of the connection groove 50 by being recessed by a predetermined depth upward or downward therefrom.

The inside of the press rib mounting groove 52 may be a part in which the press rib 80 of the fork terminal 70 to be described later is inserted and is elastically transformed to be fastened as illustrated in FIG. 10.

A guide surface 54 may be formed on the entrance side of the press rib mounting groove 52. The guide surface 54 may be configured to be inclined gradually downward from the entrance side of the press rib mounting groove 52 toward the inside thereof. When inserting a press rib 80 to be described later into the press rib mounting groove 52, the guide surface 54 may function to guide the press rib 80 into the press rib mounting groove 52.

The circuit board 60 may be mounted to the rear surface of the housing 10. The circuit board 60 is a general circuit board, so detailed description thereof will be omitted. The circuit board 60 may be configured as an "L"-shaped flat plate corresponding to the housing 10 and may be coupled to the housing 10.

Additionally, the connector 12 may be connected to a side of the circuit board 60 such that external power and various control signals can be transmitted thereto.

A plurality of fork terminals 70 may be mounted to the front surface of the circuit board 60. When mounting the circuit board 60 to the housing 10, the fork terminal 70 may be installed at a position corresponding to the connection groove 50.

The fork terminal 70 may be composed of a fixed plate 72, a pair of contact plates 74, a terminal insertion groove 76, a contact protrusion 78, and the press rib 80.

The fixed plate 72 may be made of a quadrangular plate, and may be formed by protruding in a direction orthogonal to the circuit board 60. The fixed plate 72 may be electrically connected to the circuit board 60 and may function to support the contact plates 74 to be described later.

The pair of contact plates 74 may be formed at the front of the fixed plate 72. The contact plates 74 may be configured to be integrated with the fixed plate 72 and may be formed respectively on the upper and lower sides of the front surface of the fixed plate 72 by protruding by predetermined lengths forward therefrom. Each of the contact plates 74 may be inserted into the connection groove 50 and may function to support the contact protrusion 78 to be described later.

The terminal insertion groove 76 may be formed between the contact plates 74 different from each other. The terminal insertion groove 76 may be configured to have the shape of a groove having a $\triangleright$ " shape open at a front side thereof and may be a part into which the motor assembly terminal 40 is inserted.

That is, when connecting the fork terminal 70 to the motor assembly terminal 40, the contact plates 74 may be elastically transformed respectively to the upper and lower sides to open the contact plates 74, and while the motor assembly terminal 40 is mounted in the terminal insertion groove 76, the contact plates 74 may be pressed respectively in upward and downward directions such that the fork terminal 70 and the motor assembly terminal 40 can be in contact with each other.

In addition, the contact protrusion 78 may be formed on the upper or lower part of the end of the contact plate 74. The contact protrusion 78 may be configured to have a protruding shape having a round surface as illustrated in FIG. 9, and may be formed by protruding toward the motor assembly terminal 40. The contact protrusion 78 may be in close contact with and be coupled to each of the upper and lower surfaces of the motor assembly terminal 40, and may function to electrically connect the motor assembly terminal 40 with the fork terminal 70.

The press rib 80 may be formed on the upper or lower part of the end of the contact plate 74. As illustrated in FIG. 9, the press rib 80 may be formed at a side opposite to the contact protrusion 78 such that the press rib 80 has the shape of a rib having an arc shape or is bent by extending from the end of the contact plate 74.

In addition, the press rib 80 may be formed by bending to be curved in a direction opposite to the insertion direction of the fork terminal 70. The press rib 80 may be installed on the end of the contact plate 74 and may function to allow the contact protrusion 78 to additionally press the motor assembly terminal 40 when the contact plate 74 is inserted into the connection groove 50.

That is, when the contact plate 74 is mounted inside the connection groove 50, the press rib 80 may be elastically transformed inside the press rib mounting groove 52 and, at the same time, may allow the contact protrusion 78 to additionally press the upper or lower surface of the motor assembly terminal 40, so the connection of the motor assembly terminal 40 with the fork terminal 70 may be more securely performed.

Hereinafter, the operation of the terminal coupling structure of an electric actuator having the above-described configuration according to the present disclosure will be described with reference to FIGS. 1 to 10.

First, the motor assembly 20 and the gear assembly 30 may be installed in the inner space 11 of the housing 10. A plurality of motor assembly terminals 40 of the motor assembly 20 installed inside the housing 10 may be disposed horizontally inside a plurality of connection grooves 50 formed in the housing 10.

While the motor assembly 20 and the gear assembly 30 are mounted in the inner space 11 of the housing 10, the circuit board 60 and the connector 12 for the electrical connection of the motor assembly may be installed.

The plurality of fork terminals 70 may be installed on the front surface of the circuit board 60, and may be inserted respectively into the connection grooves 50 of the housing 10.

The motor assembly terminal 40 and the fork terminal 70 may be coupled to each other by moving the circuit board 60 forward from the rear side of the housing 10.

The contact of the fork terminal 70 with the motor assembly terminal 40 may be performed in such a manner that while inserting the fork terminal 70 into the connection groove 50, the contact plate 74 formed on the front of the fork terminal 70 is elastically transformed in an upward or downward direction such that the contact protrusion 78 of the contact plate 74 presses and is in close contact with each of the upper and lower surfaces of the motor assembly terminal 40.

Furthermore, due to the elastic transformation of the contact plate 74, the contact protrusion 78 may firstly press and be in close contact with the motor assembly terminal 40, and then the press rib 80 installed on the end of the contact plate 74 may be inserted into the press rib mounting groove 52.

In the process in which the press rib 80 is inserted into the press rib mounting groove 52, the press rib 80 may allow the contact plate 74 to additionally press the motor assembly terminal 40, so the contact of the motor assembly terminal 40 with the contact protrusion 78 may be more securely performed.

As described above, the press rib 80 may be installed on the end of the contact plate 74, and the contact protrusion 78 and the motor assembly terminal 40 may be more securely in contact with each other, thereby preventing a short circuit in the coupling portion of terminals to each other due to vibration or an external impact.

In addition, in a case in which without the press rib 80, the motor assembly terminal 40 and the fork terminal 70 are maintained to be in contact with each other for a long period of time, due to the deformation of the fork terminal 70, a short circuit of the motor assembly terminal 40 may occur, but due to the installation of the press rib 80, even if the motor assembly terminal 40 and the fork terminal 70 are in contact with each other for a long period of time, the press rib 80 may press the contact plate 74 with a predetermined pressing force, thereby minimizing a short circuit between the motor assembly terminal 40 and the fork terminal 70.

The technical scope of the present disclosure may not be limited to the embodiment illustrated above, and within the technical scope as described above, many other modifications based on the present disclosure will be possible for those skilled in the art.

What is claimed is:

1. A terminal coupling structure of an electric actuator, the structure comprising:

a housing constituting an appearance of the electric actuator and having multiple parts installed in the housing;

a motor assembly fixed to a side of the housing and having a motor assembly terminal so as to transmit power and various control signals to a motor and to generate a driving force;

a gear assembly installed inside the housing and connected to the motor assembly so as to be rotated by receiving the driving force of the motor assembly;

a circuit board fixed on a surface of the housing, the circuit board being configured to receive external power and various control signals so as to supply the power to the motor assembly and to control the motor assembly;

a connection groove formed to be recessed inside the housing such that the motor assembly terminal is inserted into and is disposed in the connection groove; and a fork terminal installed on a surface of the circuit board, the fork terminal being inserted into the connection groove to be in contact with the motor assembly terminal, wherein the fork terminal comprises:

a fixed plate made of a metal plate having a predetermined thickness and coupled fixedly to the circuit board;

a pair of contact plates formed by protruding forward from the fixed plate and disposed respectively on upper and lower sides of the motor assembly terminal;

a terminal insertion groove formed between the contact plates different from each other by being recessed by a predetermined depth therefrom such that the motor assembly terminal is inserted into the terminal insertion groove;

a contact protrusion formed to have a round shape on an end of each of the contact plates by protruding therefrom, the contact protrusion being in close contact with an upper or lower surface of the motor assembly terminal; and a press rib formed on the end of the contact plate by extending therefrom, the press rib being in close contact with an inner surface of the connection groove so as to allow the contact protrusion to press the motor assembly terminal.

2. The structure of claim 1, further comprising:

a press rib mounting groove formed in the inner surface of the connection groove such that the press rib is elastically transformed and is inserted into the press rib mounting groove while the press rib is inserted into the connection groove.

3. The structure of claim 2, further comprising:

a guide surface formed on a side of the press rib mounting groove so as to be inclined at a predetermined angle, the guide surface being configured to guide the press rib into the press rib mounting groove.

4. The structure of claim 1, wherein the press rib is formed by protruding in a direction opposite to the contact protrusion.

5. The structure of claim 1, wherein the press rib is formed on the end of the contact plate by bending in a direction opposite to an insertion direction of the contact plate.

* * * * *